(12) United States Patent
Thomas et al.

(10) Patent No.: US 7,367,220 B2
(45) Date of Patent: May 6, 2008

(54) ENGINE OIL LEAK TEST METHOD WITH EGR VALVE LEAK OFFSET

(75) Inventors: Heather W. Thomas, Bellefontaine, OH (US); Chuck Hoke, Piqua, OH (US); Brent C. Rankin, Lima, OH (US)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 11/325,714

(22) Filed: Jan. 5, 2006

(65) Prior Publication Data

US 2007/0151329 A1 Jul. 5, 2007

(51) Int. Cl.
*G01M 3/26* (2006.01)
*G01M 15/00* (2006.01)

(52) U.S. Cl. ............... 73/47; 73/49.7; 73/118.1

(58) Field of Classification Search ............ 73/47, 73/49.7, 40, 46, 118.1
See application file for complete search history.

(56) References Cited

U.S. PATENT DOCUMENTS

| | | | |
|---|---|---|---|
| 4,269,061 A * | 5/1981 | Hatsuno et al. .......... 73/40 |
| 6,711,944 B2 | 3/2004 | Maruta et al. |
| 6,850,834 B1 | 2/2005 | Yu et al. |
| 6,854,449 B2 | 2/2005 | Iino et al. |
| 6,862,878 B2 | 3/2005 | Ries-Mueller |
| 6,901,743 B2 | 6/2005 | Asanuma et al. |
| 2005/0000207 A1 | 1/2005 | Christl |
| 2005/0109017 A1 | 5/2005 | Wirkus et al. |

FOREIGN PATENT DOCUMENTS

| GB | 2089982 A | * | 6/1982 | ........... 73/49.7 |
|---|---|---|---|---|
| JP | 61-196132 A | * | 8/1986 | ........... 73/49.7 |
| JP | 6-331486 | * | 12/1994 | ........... 73/49.7 |

* cited by examiner

*Primary Examiner*—Daniel S. Larkin
(74) *Attorney, Agent, or Firm*—Rankin, Hill & Clark LLP; Vincent Ciamacco

(57) ABSTRACT

A method for pressure testing an engine to detect possible oil seal leaks. The engine is charged with a predetermined pressure while air pressure is also applied to an exhaust gas recirculation (EGR) valve intake port to offset leakage inherent in the EGR valve. Thereafter, a pressure drop in the engine pressure is used to determine whether an oil seal leak may be present. Applying pressurized air to the EGR valve intake port compensates for EGR valve leakage and prevents the EGR valve leakage from masking possible oil seal leaks, thereby making the system more sensitive to such potential oil seal leaks.

11 Claims, 5 Drawing Sheets

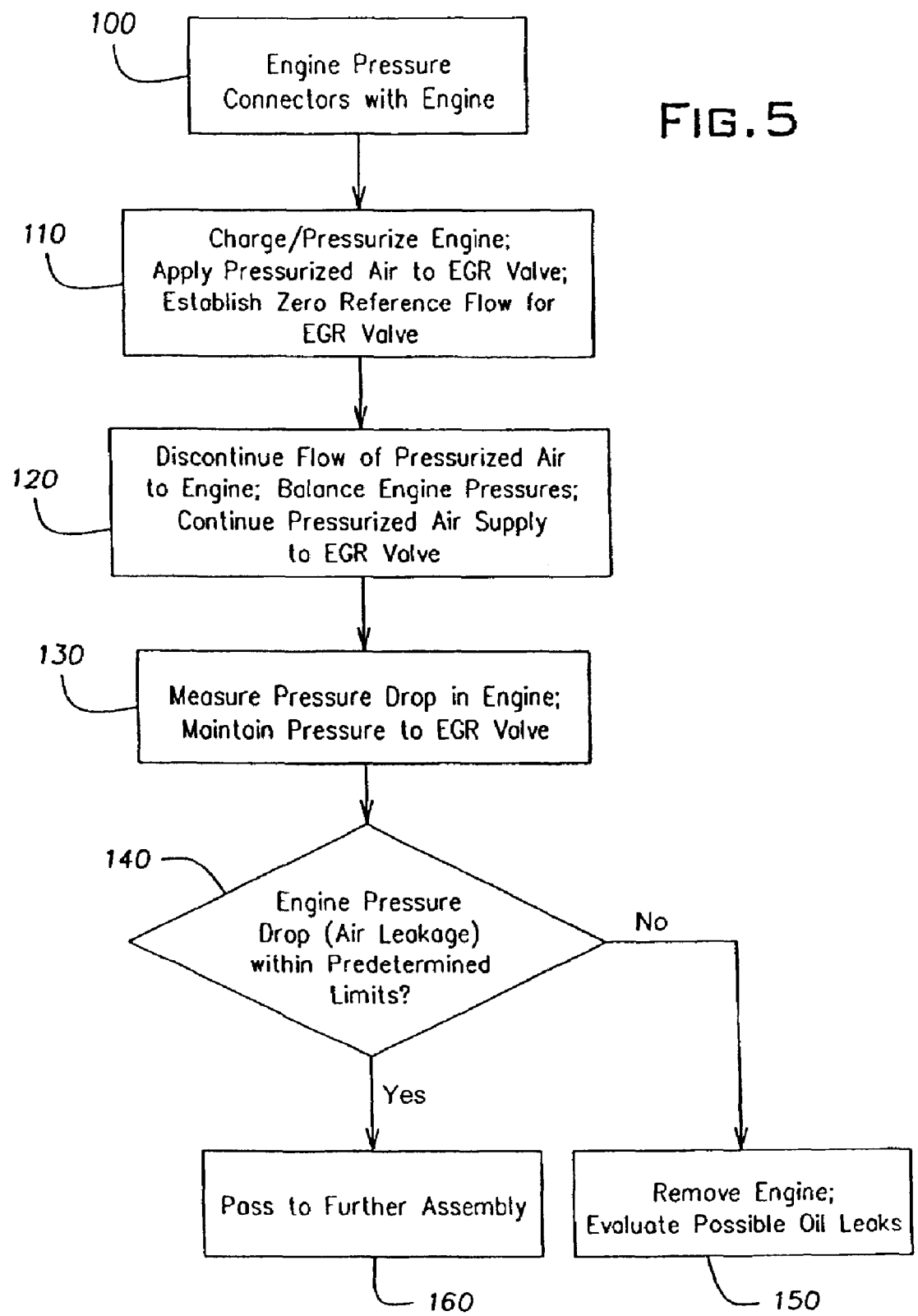

ENGINE OIL LEAK TEST METHOD WITH EGR VALVE LEAK OFFSET

BACKGROUND OF THE INVENTION

1. Field of the Invention

The present invention generally relates to engine leak testing and, more specifically, toward, a method for pressure testing engines.

2. Description of Related Art

During the manufacture of engines, it is desirable to test the assembled engine to determine if any of the various oil seals are leaking. Such leaks can occur due to assembly errors, damaged seals, or contamination of the sealing surfaces. However, due to the construction of modern engines, it has proven difficult to develop engine leak testing methods that can be employed quickly, as is required for manufacturing efficiency.

One problem encountered in developing effective leak tests is that there are numerous places to which pressurized air may be applied to an engine, and a similar number of areas that air will flow out of a pressurized engine. Air can be applied to the intake manifold, the exhaust manifolds, the engine oil fill, and one or more ports on the head cover. Air can also leak out of a pressurized engine at the intake manifold, the exhaust manifolds, and the exhaust gas recirculation valve.

One known testing method that has been employed in the past involves introducing pressurized air through one of the head covers, and then measuring the flow rate of pressurized air through the engine. In this method, the pressurized air exits the engine via the intake and exhaust manifolds, and this rate of flow is used as a baseline to determine whether the engine is leaking at other locations. However, it has been found that the flow rate through the engine is so great that it masks any leaks that may occur. Accordingly, the known testing method is not sensitive enough to reliably detect engine oil leaks.

Therefore, there exists a need in the art for a method to test an engine for potential oil leaks.

SUMMARY OF THE INVENTION

The present invention is directed toward a method for testing an engine for oil leaks. The present invention is further directed toward a method for pressurizing an engine to detect possible oil leaks, and toward such a method that provides a pressure offset to compensate for leaks inherent in an exhaust gas recirculation (EGR) valve.

In accordance with the present invention, the engine is charged with pressurized air while an intake side of the EGR valve is provided with pressurized air to compensate for or balance leaks inherent in the EGR valve. Once the engine is pressurized, supply of pressurized air to the engine is discontinued and the engine pressure drop is measured or monitored for a predetermined period of time. The measured pressure drop is used to determine the rate at which the engine leaks. A pressure drop in the engine in excess of a predetermined limit is indicative of leaking engine oil seals.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
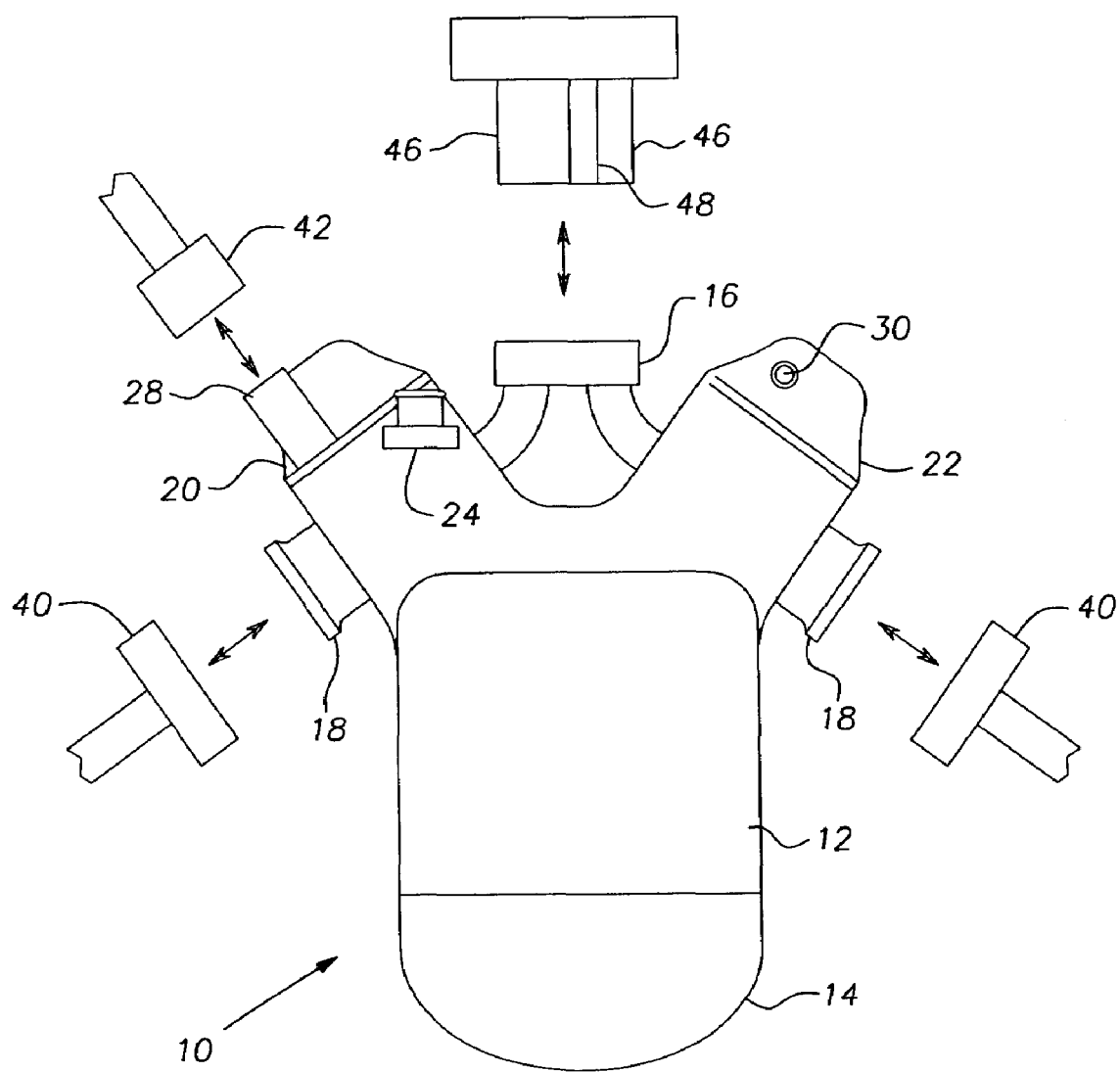
FIG. 1 is a schematic front view of an engine and a pressurizing apparatus.

With reference to the drawing figures, an engine 10 includes a cast engine block 12, a crank case 14, an air intake base 16, a pair of exhaust manifolds 18, first and second head covers 20, 22, and an exhaust gas recirculation (EGR) valve 24.

The EGR valve 24 permits exhaust gas to be communicated from an exhaust of one or more of the engine cylinders back to an intake manifold (not shown), via the air intake base 16, so as to mix exhaust gas with incoming fresh combustion air and thereby improve engine efficiency. As such, the EGR valve 24 has an exhaust side that communicates with the exhaust of the engine 10, and an intake side that communicates with the intake manifold via an EGR port 26 formed on the top surface of the air intake base 16, as shown best in FIG. 2.

The first head cover 20 includes an oil fill tube 28 and the second head cover 22 includes a port 30, which is sometimes referred to as a breather port.

The air intake base 16 receives fresh combustion air and recirculated exhaust gases from the air intake manifold and communicates a combustion air mixture to each of the cylinders. The air intake base 16 includes a series of air intake passageways 31, each of the passageways being dedicated to a particular cylinder.

Each exhaust manifold 18 receives exhaust gases from cylinders on an associated side of the engine 10, and includes an exhaust port 32 that is connected to a vehicle exhaust system (not shown) and through which the exhaust gases flow.

It is noted that the engine 10 described to this point is relatively conventional and well known in the art, and that the engine structure forms no part of the present invention. It is further noted that the engine oil seal testing method of the present invention is not limited to the engine structure described herein, which is exemplary in nature. Rather, it is considered apparent that, with the principles described herein, one skilled in the art could easily adapt the method of the present invention to any engine design.

The engine 10 includes a series of oil seals that prevent engine oil, which is primarily held in the crankcase 14 but distributed throughout the engine (i.e., oil system) to lubricate moving parts, from leaking out of the engine 10. These oil seals include one or more seals installed in the engine block 12 and the crankcase 14, and between the head covers 20, 22 and the engine block 12. The present invention provides a method for testing the oil seals for leaks by pressurizing the engine 10 and monitoring the pressurized engine for air leaks indicative of a leak at one or more engine oil seals.

Figure 2:
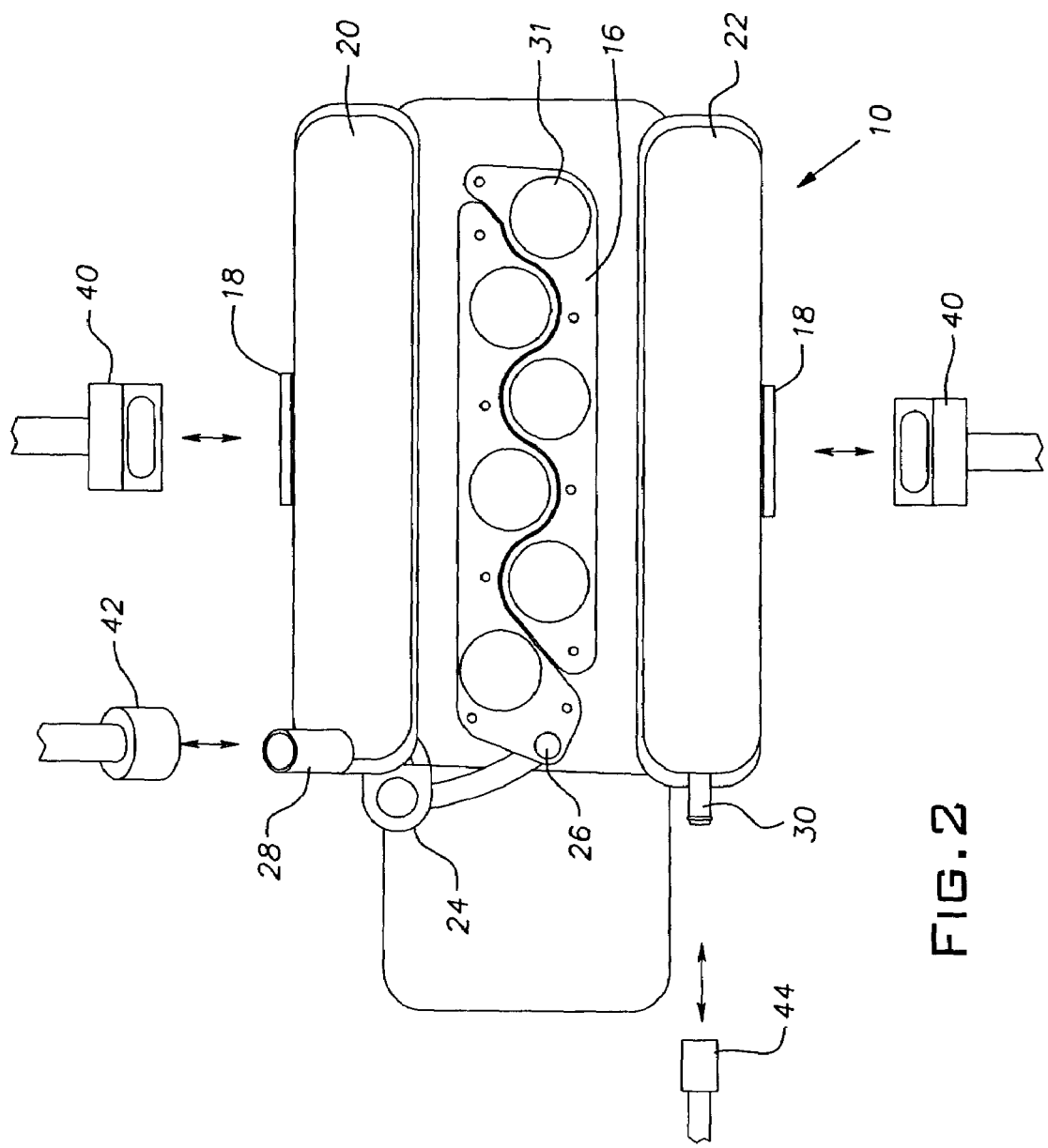
FIG. 2 is a schematic top plan view of the engine and portions of the pressurizing apparatus.
Figure 3:
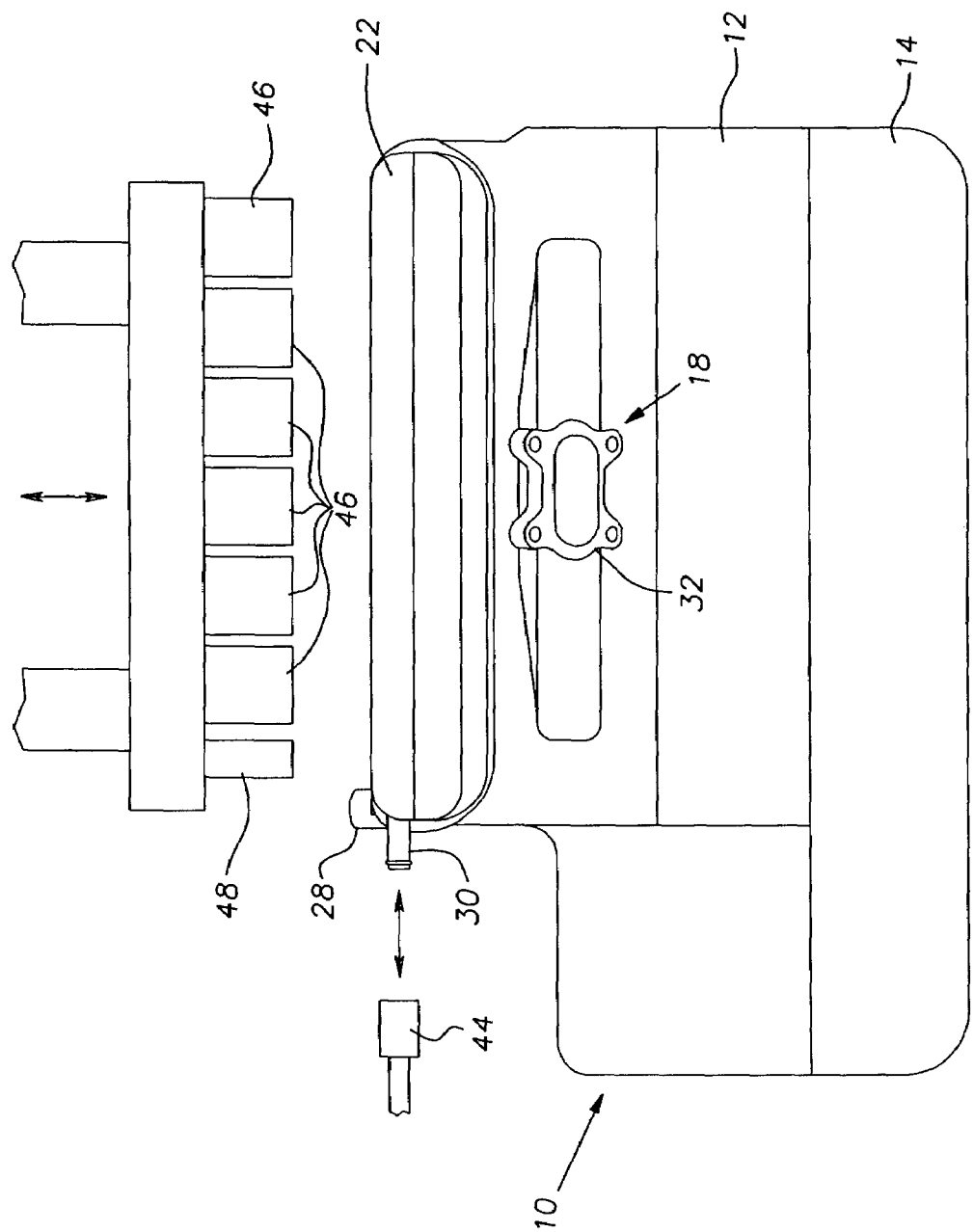
FIG. 3 is a schematic side view of the engine and portions of the pressurizing apparatus.

With reference to FIGS. 1-3, portions of a pressurizing apparatus are shown in connection with the engine 10 that is to be tested. The pressurizing apparatus includes a series of pressure connectors that sealingly engage associated portions of the engine 10 and that are used to introduce pressurizing air into the engine 10 so as to pressurize the oil system and the intake and exhaust passages of the engine 10. The pressure connectors include a pair of exhaust manifold pressure connectors 40, an engine oil fill tube pressure connector 42, a head cover port pressure connector 44, a series of air intake passageway pressure connectors 46, and an EGR port pressure connector 48. As will be appreciated, the exhaust manifold pressure connectors 40 are adapted to sealingly engage the exhaust manifolds 18; the engine oil fill tube pressure connector 42 is adapted to sealingly engage the oil fill tube 28; the head cover port pressure connector 44 is adapted to sealingly engage the head cover port (breather port) 30; the air intake passageway pressure connectors 46 are adapted to sealingly engage the air intake passageways 31 in the air intake base 16; the EGR port pressure connector 48 is adapted to sealingly engage the EGR port 26 formed in the air intake base 16.

The pressure connectors are disposed on associated mechanisms, such as robot arms (not shown), so as to be movable toward and away from the engine 10. Accordingly, the pressure connectors are normally in a relatively retracted position between testing procedures and, upon initiation of a testing procedure, are moved into an extended position in sealing engagement with associated portions of the engine 10. Shortly thereafter, pressurized air from a source of pressurized air is introduced via the pressure connectors into the engine 10. More specifically, pressurized air is introduced into the engine 10 via the oil fill tube 28, the exhaust manifold ports 32, the air intake passageways 31, and the head cover port 30, which are hereafter collectively referred to as the engine pressurizing ports, and used to pressurize the engine 10. Pressurized air is also provided to the EGR valve 24 via the EGR port 26. As will be appreciated from the following description, pressurized air provided via the EGR port 26 is used to compensate or offset for leakage inherent in the EGR valve 24, and thereby eliminates a source of error in the engine oil leak testing method.

Figure 4:
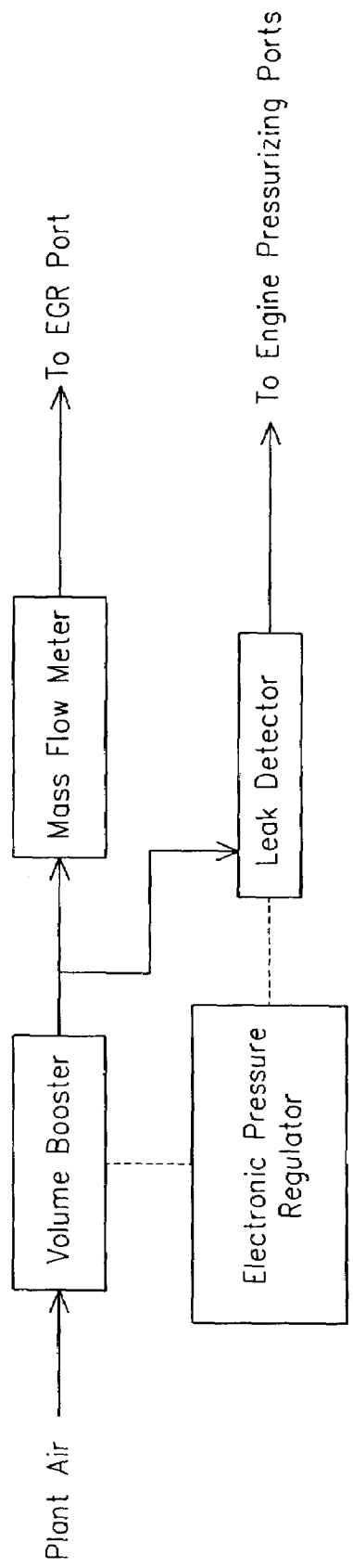
FIG. 4 is a schematic illustration of an engine pressurizing and monitoring system; and, FIG. 5 is a flow chart detailing the steps of the inventive method.

With reference to FIG. 4, the pressurization system is schematically illustrated. Plant air, which is typically at between about 7 to 8 kg/cm$^2$, is provided to a volume booster. An orifice opening in the volume booster is electronically controlled by an electronic pressure regulator to provide output or test air at a predetermined, reduced pressure. In the preferred embodiment the mass flow meter and leak tester provide air at about 0.2 kg/cm$^2$. The pressurized air, at the predetermined pressure, is provided to the EGR intake port 26 via the mass flow meter, which monitors air flow through the EGR intake port 26. The pressured air, at the predetermined pressure, is also provided to the engine pressurizing ports via the leak tester. As will be apparent to those skilled in the art, the leak tester is adapted, once the engine is pressurized, to monitor leakage of air from the pressurized engine 10 by sensing or measuring drops in engine pressure. A suitable leak tester is sold by Cosmo Instruments Co., Ltd. of Tokyo, Japan, as model number LS-1842.

More specifically, air at the predetermined pressure is introduced into the engine 10 via the engine pressurizing ports by the exhaust manifold pressure connectors 40, the engine oil fill tube pressure connector 42, head cover port pressure connector 44, and air intake pressure connectors 46, and pressurizes the oil system and the exhaust and intake passages of the engine 10. Pressurized air in the exhaust passageways charges the exhaust side of the EGR valve 24. However, the EGR valve 24 is not a fluid tight body and will ordinarily leak air. Air leaking from the EGR valve 24 is 'noise' or a variable in the system that would ordinarily make it difficult to determine whether the engine 10 is leaking air at a rate indicative of a possible oil leak. However, in the present invention, as noted hereinbefore, pressurized air is also provided to the intake side of the EGR valve 24 via the EGR port 26 on the air intake base 16. The pressurized air provided to the EGR valve 24 via the EGR port 26 compensates for leaks in the EGR valve 24, and thereby makes it possible to determine whether the engine oil seals are leaking, as described hereinafter.

With reference to FIG. 5, steps in performing a testing procedure will be described. Initially, the pressure connectors are sealingly engaged with the engine (step 100) and then, during a charging step (step 110) pressurized air is provided to the engine via the pressure connectors to charge the engine with pressurized air. During the charging step, pressurized air is provided to the engine pressurizing ports and to the EGR port 26. In the preferred embodiment, the pressure of the air provided to the engine pressurizing ports is identical to the pressure of the air provided to the EGR port 26.

The flow rate to the EGR port 26 necessary to maintain the desired pressure is determined during the charging step, and used by the mass flow meter as a zero reference. The mass flow meter maintains this zero reference flow rate during subsequent steps of the leak test. By charging the oil system and zeroing flow through the EGR valve 24 so as to compensate for leaks from the EGR valve 24, the EGR valve is eliminated as a source of 'noise' in the system. Eliminating the EGR valve 'noise' from the system permits the leak tester, during a subsequent monitoring step (step 130), to accurately sense pressure drops/air leaking from the engine, as will be apparent from the following description.

Thereafter, during a balancing step (step 120), pressurized air is no longer provided to the engine via the engine pressurizing ports. However, pressurizing air at the flow rate determined during the charging step continues to flow through the EGR port 26 to maintain the predetermined pressure in the EGR valve 24 and thereby compensate for leaks in the EGR valve 24. After a predetermined period of time, the pressures or pneumatics within the engine 10 are considered balanced or equalized such that the engine can thereafter be monitored for leaks.

After the balancing step, the leak tester monitors the engine for a predetermined period of time (detect cycle) to sense or measure a pressure drop in the engine and thereby determine a rate of leakage, if any, of the engine (step 130). If the measured pressure drop, which is correlated to a rate of engine air leakage, is outside of predetermined limits (step 140), it is determined that the engine may have a possible oil leak, and the engine will be removed for further evaluation (step 150). If the pressure drop/rate of engine air leakage is within predetermined limits, the engine is passed for further assembly (step 160).

While the present invention has been described with particularity herein, it is considered apparent that the numerous modifications or additions may be resorted to without departing from the scope and spirit of the present invention. Rather, taken broadly, the present invention teaches a method of pressure testing an engine for possible oil leaks that includes a methodology for compensating for inherently leaking engine components, such as the EGR valve, and it is considered apparent that the present method may be adapted to compensate for other engine components that likewise leak air. Accordingly, the present invention is not limited to the preferred embodiment that has been described with particularity hereinbefore, but rather is only to be defined by the claims appended hereto.

What is claimed is:

1. A method for pressure testing an engine for leaking oil seals, comprising the steps of:
   connecting the engine to a source of pressurized air, including the step of sealingly connecting pressure connections to engine pressurizing ports, said engine pressurizing ports including exhaust manifolds, air intake passageways, an oil fill tube, and a head cover port;
   charging the engine with pressurized air so as to place an oil system of the engine at a predetermined pressure;
   after the oil system is at the predetermined pressure, monitoring the pressure in the engine oil system for a predetermined period of time to detect a drop in pressure; and,
   using the detected pressure drop to determine whether the engine is leaking air at a rate that is indicative of a leak in one or more oil seals.

2. The method of claim 1, wherein said connecting step further comprises sealingly connecting a pressure connection to an exhaust gas recirculation (EGR) valve intake port.

3. The method of claim 1, comprising the further step of compensating for leakage inherent in an engine component.

4. The method of claim 3, wherein said compensating step comprises supplying pressurized air to an exhaust gas recirculation (EGR) valve intake port.

5. The method of claim 4, wherein said connecting step comprises: sealingly connecting pressure connections to engine pressurizing ports, said engine pressurizing ports including exhaust manifolds and air intake passageways.

6. The method of claim 5, wherein said engine pressurizing ports further include an oil fill tube and a head cover port.

7. The method of claim 6, wherein said connecting step further comprises sealingly connecting a pressure connection to an exhaust gas recirculation (EGR) valve intake port.

8. A method for pressure testing an engine for leaking oil seals, comprising the steps of:
   connecting pressurizing ports of the engine to a source of pressurized air;
   charging an oil system of the engine with pressurized air, at a predetermined pressure, via said pressurizing ports;
   supplying pressurized air to an intake side of an exhaust gas recirculation (EGR) valve to thereby compensate for leakage inherent in said EGR valve;
   after the engine oil system is at the predetermined pressure, discontinuing supply of pressurized air to said pressurizing ports, continuing to supply pressurized air to said EGR valve intake side, and monitoring a pressure of said engine for a predetermined period of time to measure an engine pressure drop; and,
   using the measured engine pressure drop to determine whether the engine is leaking air at a rate that is indicative of a leak in one or more oil seals.

9. The method of claim 8, wherein said engine pressurizing ports including exhaust manifolds and air intake passageways.

10. The method of claim 9, wherein said engine pressurizing ports further include an oil fill tube and a head cover port.

11. The method of claim 10, wherein said connecting step further comprises sealingly connecting a pressure connection to an exhaust gas recirculation (EGR) valve intake port.

* * * * *